(12) United States Patent
Yamada et al.

(10) Patent No.: US 7,555,321 B2
(45) Date of Patent: Jun. 30, 2009

(54) COMMUNICATION PORTABLE TERMINAL DEVICE

(75) Inventors: Taku Yamada, Kanagawa (JP); Kanta Judai, Kanagawa (JP); Yuichi Sawada, Kanagawa (JP)

(73) Assignee: Panasonic Corporation, Osaka (JP)

( * ) Notice: Subject to any disclaimer, the term of this patent is extended or adjusted under 35 U.S.C. 154(b) by 166 days.

(21) Appl. No.: 10/567,479

(22) PCT Filed: Aug. 7, 2003

(86) PCT No.: PCT/JP03/10079

§ 371 (c)(1),
(2), (4) Date: Oct. 16, 2006

(87) PCT Pub. No.: WO2005/015886

PCT Pub. Date: Feb. 17, 2005

(65) Prior Publication Data

US 2007/0032258 A1 Feb. 8, 2007

(51) Int. Cl.
*H04M 1/00* (2006.01)
(52) U.S. Cl. ............... 455/575.1; 455/575.2; 455/575.3; 455/575.4; 455/575.5; 455/575.6; 455/575.7; 455/575.8; 455/575.9; 385/12
(58) Field of Classification Search ................. 455/566, 455/567, 575.1–0.9; 379/330, 373.01; 385/12
See application file for complete search history.

(56) References Cited

U.S. PATENT DOCUMENTS 6,745,057 B1 * 6/2004 Hankui .................... 455/575.5
6,771,938 B2 * 8/2004 Lustila et al. ............ 455/575.1
7,076,276 B2 * 7/2006 Kemppinen ................ 455/567
2005/0157971 A1 * 7/2005 Juijve et al. .................... 385/12

FOREIGN PATENT DOCUMENTS

| JP | 51-11356 | 1/1976 |
|----|----------|--------|
| JP | 58-195279 | 12/1983 |
| JP | 59-73787 | 5/1984 |
| JP | 8-278759 | 10/1996 |
| JP | 9-277884 | 10/1997 |
| JP | 2000-98105 | 4/2000 |
| JP | 2003-115912 | 4/2003 |

* cited by examiner

*Primary Examiner*—Nick Corsaro
*Assistant Examiner*—Vladimir Magloire
(74) *Attorney, Agent, or Firm*—Pearne & Gordon LLP

(57) ABSTRACT

It is an object of the invention to emit a light in order to brighten a large area by a single light source. The invention provides a communication portable terminal device including a single LED (51) disposed in an upper housing (1) and a light emitting panel (4) disposed on the upper housing (1) for emitting a light like a plane by a light emitted from the LED (51), the light emitting panel (4) including a light transmitting member (40) having an incident plane (42) on which the light emitted from the LED (51) is incident and a light emitting plane (44) for emitting a light like a plane by the light emitted from the LED (51), and a reflecting film (41) and a print film (43) provided on a surface and a back face of the light transmitting member (40) for reflecting the light emitted from the LED (51) and incident on the incident plane (42) of the light transmitting member (40) many times between the surface and the back face, thereby guiding the light to the light emitting plane (44).

6 Claims, 4 Drawing Sheets

COMMUNICATION PORTABLE TERMINAL DEVICE

TECHNICAL FIELD

The present invention relates to a communication portable terminal device, and more particularly to a communication portable terminal device capable of giving a notice that there is a call from a calling destination or an incoming call of a mail through a light emission in a wide area.

BACKGROUND ART

In a cell phone, as is well known, it is possible to inform a user that there is a call from a calling destination or an incoming call of a mail through a ring or a ringer tone. However, it is not preferable to make a sound depending on a place of use. For this reason, a cell phone for giving a notice of a call and an incoming call through a vibration (a vibrator) in place of a sound has also spread widely.

Moreover, there has also been known a cell phone including a light emitting unit having a light source in order to give a notice of a call and an incoming call through a light in place of the sound and the vibration. In particular, the notice of the call and the incoming call through the light emitting operation is useful for the case of a utilization in a place in which it is not preferable to make a sound and a utilization of a user having such a disorder that a sound is caught with difficulty or cannot be caught.

In the case in which a light source such as an LED is usually utilized to cause a light emitting unit to emit a light, for example, there are known a method of providing a small light emitting unit in a part of a housing to emit a light and a method of utilizing a partial limited local region in a display unit for displaying information such as an LCD to emit a light therefrom (for example, see JP-A-2000-98105).

In some cases in which a small light emitting unit is provided to emit a light from a small area in the former method, for example, it is hard to visually recognize the emission of the light. There is also a possibility that the light emitting operation might be known with a delay and a phone might be thus hung up before a response to a call from a partner or a calling state might be missed, resulting in a failure in calling.

On the other hand, in some cases in which the type for causing the display unit to emit a light in the latter method has such a structure as to cause a part of the display unit to locally emit a light, it is hard to visually know the call in the same manner as in the former case.

Under the circumstances, it is possible to propose that a light emitting unit having a large light emitting area is disposed. In the case in which the light emitting unit has a large area, however, it is hard to obtain a sufficient amount of a light emitted in a light emitting operation to be carried out by one light source (LED). When a light is to be emitted in the large area, therefore, the amount of the light is reduced in a distant region from the LED and the same region becomes dark, and the emission of the light can be recognized clearly in only a close region to the LED. For this reason, an advantage cannot be obtained even if a light emitting area is increased. By disposing a plurality of light sources (LEDs), therefore, it is possible to cause a whole light emitting unit having a large area to emit a light in a sufficient amount. Corresponding to the use of the light sources, however, a built-in battery is consumed greatly with an increase in a consumed power. As a result, a period for which a cell phone can be used by one charging operation is reduced and a complicated charging work is to be often carried out in some cases.

In consideration of the circumstances, therefore, it is an object of the invention to provide a communication portable terminal device capable of emitting a light to brighten a large area by a single light source.

DISCLOSURE OF THE INVENTION

First of all, a communication portable terminal device according to the invention comprises a single light source disposed in a housing and a light guiding panel disposed in the housing for guiding a light from the light source, the light guiding panel including a light transmitting member taking a shape of an almost plate having an incident portion provided on a back face on which the light emitted from the light source is incident and an emitting portion provided on a front face from which the light transmitted from the light source is emitted, and reflecting units provided on both of the surface and the back face of the light transmitting member for reflecting the light emitted from the light source and incident on the incident portion plural times and guiding the light to the emitting portion.

Accordingly, the light emitted from the light source which is transmitted through the inner part of the light transmitting member is repetitively reflected continuously plural times between the reflecting units provided on both of the front face and the back face of the light transmitting member without causing a phenomenon such as a leakage to an outside, an attenuation or an absorption. Consequently, the light can be propagated to the light emitting unit so that the light emitting unit can be caused to carry out a surface emission.

Secondly, the communication portable terminal device according to the invention is characterized in that the reflecting unit on the back face side includes a reflecting print portion having a peculiar color in a high reflectance on the back face side of the light transmitting member.

Accordingly, it is possible to form the reflecting units by a simple method through printing. Consequently, a manufacturing cost can be reduced. In addition, if the reflecting unit has a high reflectance, various colors can be selected. By combining the print color and a color of the light emitted from the light source, therefore, it is also possible to form various mixed colors, thereby causing the light emitting unit to carry out the surface emission.

Thirdly, the communication portable terminal device according to the invention is characterized in that the incident portion is formed in a curved concave on the back face of the light transmitting member arranged just above the light source.

Accordingly, the light emitted from the light source can be fetched (incident) at an almost equal rate in various directions through the incident portion of the light transmitting member. Consequently, it is possible to implement a uniform surface emission in the light emitting unit without emitting a light partially to only a part of the light emitting unit.

Fourthly, the communication portable terminal device according the invention is characterized in that the housing has such a foldable structure as to include an upper housing having a liquid crystal display unit provided on an inner side surface and a lower housing having an operating key provided on an opposed inner side surface to the inner side surface of the upper housing when the lower housing and the upper housings are set in a closing state, the lower housing being rotatably coupled to the upper housing through a hinge portion, and the light guiding panel is disposed on an outer side surface which is opposite to the inner side surface of the upper housing and the emitting portion on the front face faces an outside.

In a structure in which the liquid crystal display unit is not exposed to an outside with the housing portion of a folding type folded and a part of the liquid crystal display unit is caused to locally emit a light, consequently, it has conventionally been necessary to carry out a work for confirming an incoming call in a state in which the housing is opened. In the invention, however, the light emitting unit is exposed to the outside also in the state in which the housing is folded. Therefore, it is possible to confirm the light emitting state of the light emitting unit in the folding state.

Figure 1:
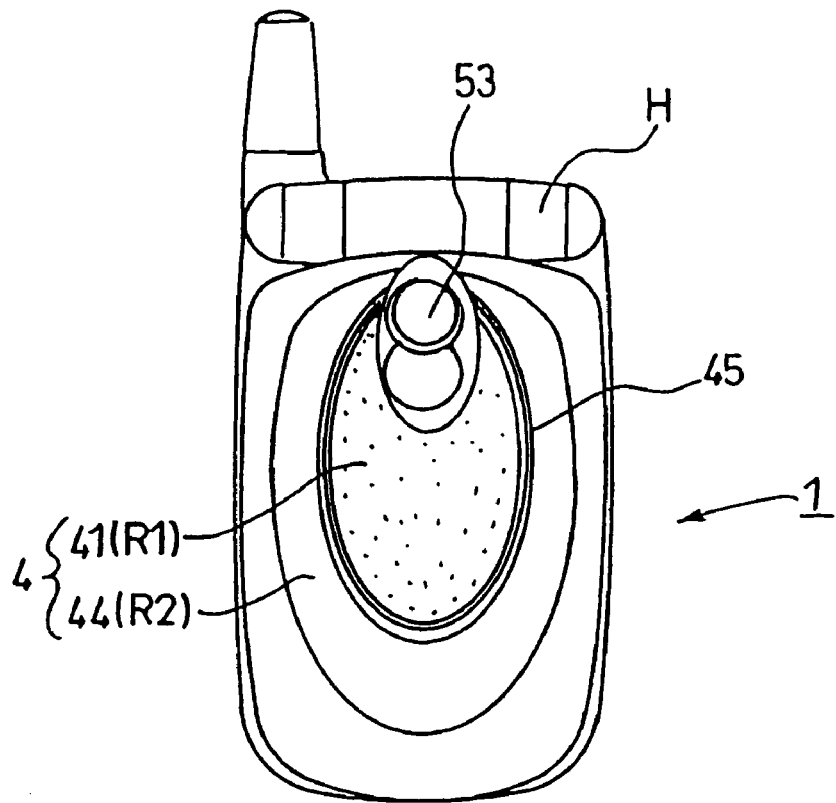
FIG. 1 is a plan view showing a part (an upper housing) of a cell phone of a folding type according to an embodiment of the invention.

In the drawings, 1 denotes an upper housing, 11 denotes an inner case, 12 denotes an outer case, 12A denotes a hole for emitting a panel illuminating light, 12B denotes a communicating window for an infrared lo communicating light, 12C denotes a photographing window for a camera, 2 denotes a liquid crystal display unit, 20 denotes an LCD body, 21 denotes a backlight unit, 22 denotes a liquid crystal holder, 23 denotes a liquid crystal panel, 3 denotes a printed circuit board, 4 denotes a light emitting panel, 40 denotes a light transmitting member (light guiding unit), 41 denotes a reflecting 5 film (one of reflecting units), 42 denotes an incident plane (incident portion), 43 denotes a print film (the other reflecting unit), 44 denotes a light emitting plane, 45 denotes a V shaped groove, 51 denotes an LED (light source), 52 denotes an IrDA, 53 denotes a camera, 54 denotes a speaker (receiver), 55 denotes a vibrator, H denotes a hinge portion, R1 denotes a central elliptic region of the 2 0 light transmitting member 40, R2 denotes a peripheral elliptic region of the light transmitting member 40, S1 denotes a surface of the light transmitting member 40, and S2 denotes a back face of the light transmitting member 40.

BEST MODE FOR CARRYING OUT THE INVENTION

An embodiment of the invention will be described below in detail with reference to the accompanying drawings.

FIG. 1 shows a cell phone of a folding type according to the embodiment of the invention. The cell phone has such a structure that a housing portion includes an upper housing 1 provided with a liquid crystal display unit 2 (see FIG. 4) on one surface which is not shown (which will be hereinafter referred to as an inner side surface), a lower housing provided with an operating key on one surface which is not shown (which will be hereinafter referred to as an inner side surface), and a hinge portion H for rotatably coupling these housings to each other.

Figure 2:
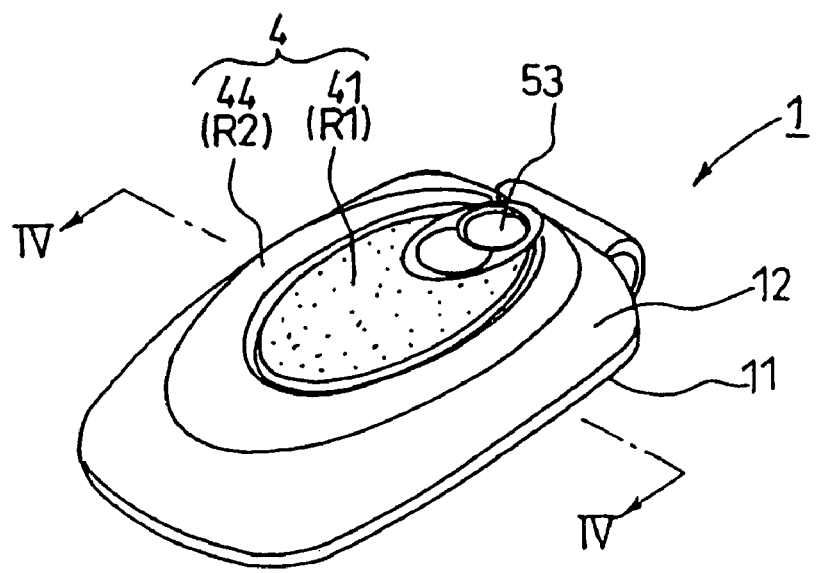
FIG. 2 is a sectional view showing the upper housing of the cell phone illustrated in FIG. 1.
Figure 3:
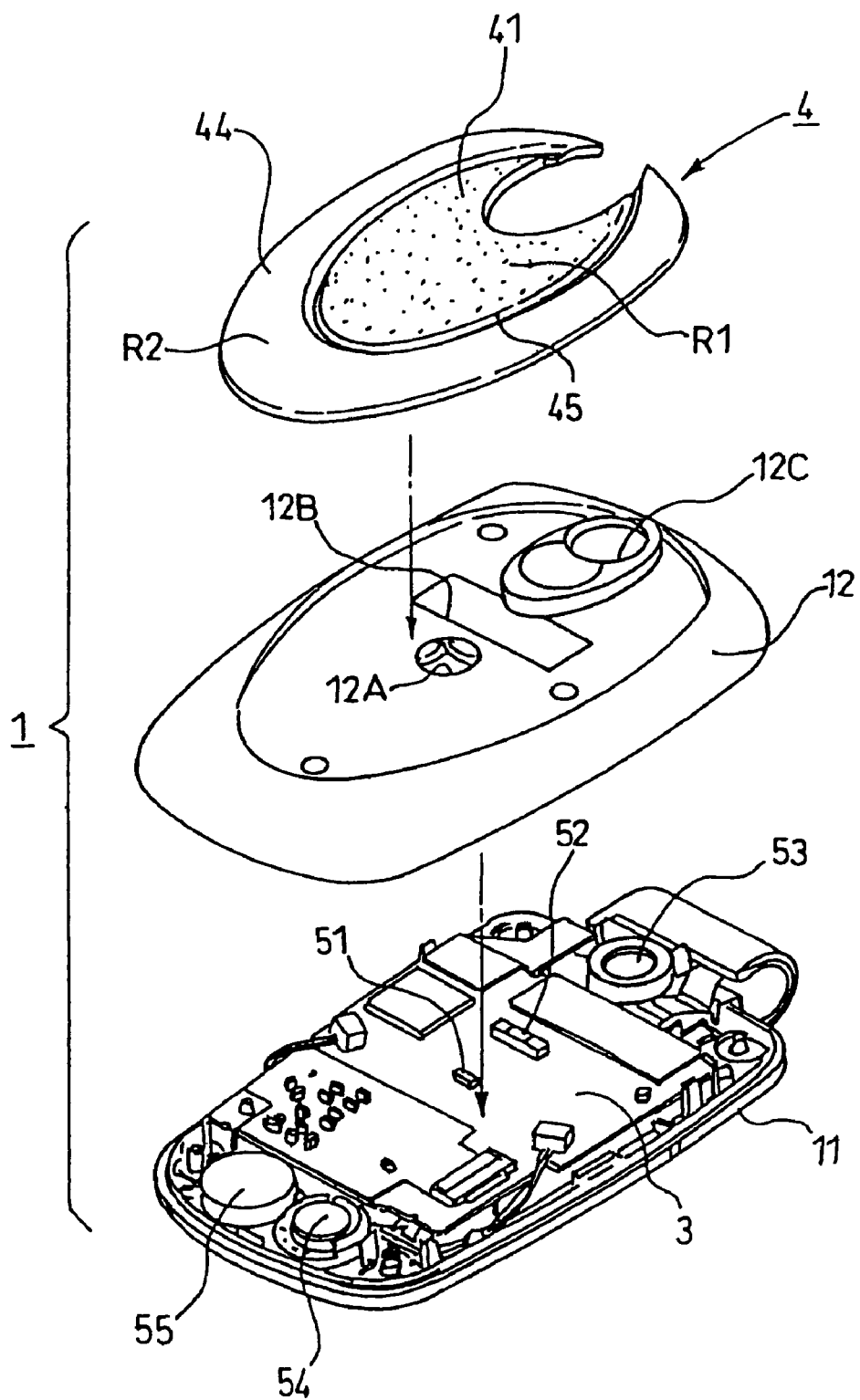
FIG. 3 is an exploded perspective view showing a main part of the upper housing of the cell phone illustrated in FIG. 1.

As shown in FIGS. 2 and 3, the upper housing i has a schematic structure as to include an inner case 11 (corresponding to an opposed portion to a lower housing when the upper and lower housings 1 are folded and closed), an outer case 12, and a light emitting panel 4 to be fixed to the outer case 12, and the inner case 11 and the outer case 12 are bonded and integrated in a state in which their opening portions are closed together. The liquid crystal display unit 2 is assembled integrally with the inner case 11, and furthermore, a printed circuit board 3 is fixed to the liquid crystal display unit 2.

The inner case 11 is formed to take an almost square thin box type (or shallow dish type) by a proper molding method, for example, injection molding by using a thermoplastic resin material obtained by adding and mixing an appropriate additive such as polycarbonate or a molding material formed by a resin or a metal such as polycarbonate, ABS or magnesium, and one of surfaces is opened so as to be bonded to the outer case 12. Moreover, the inner case 11 is provided with an opening portion in which a central part of an opposed surface to an LCD body 20 of the liquid crystal display unit 2 to be described below (a lower surface in FIG. 4) is opened greatly, and a liquid crystal panel 23 is attached to the opening portion.

On the other hand, the outer case 12 is formed to take a shape of the same almost square thin box type (or shallow dish type) through a proper molding method by using a thermoplastic resin material such as polycarbonate or ABS, and the outer case 12 having one of surfaces opened is used in the same manner as the inner case 11 so as to be bonded to the inner case 11.

Figure 4:
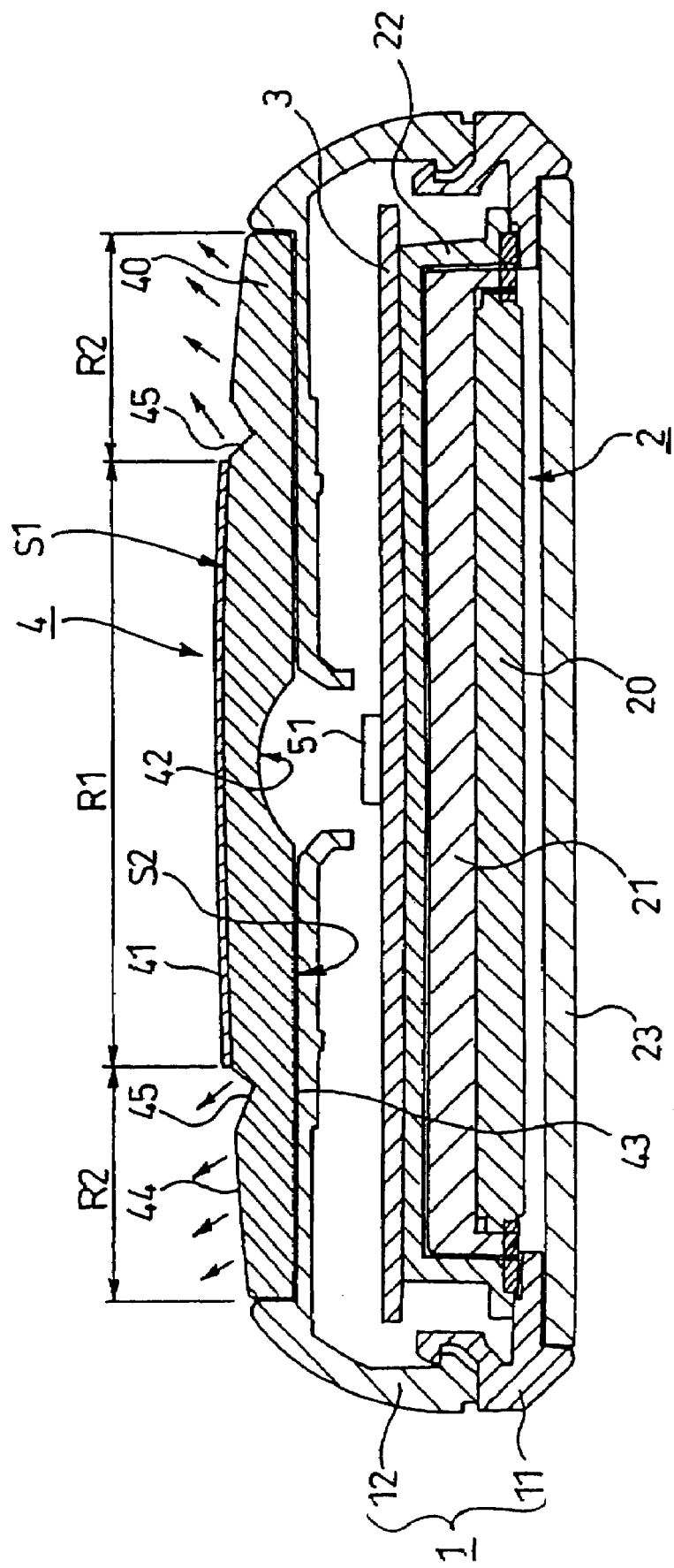
FIG. 4 is a sectional view showing a state in which a display unit including a light emitting unit for propagating a light from a light source and emitting a light and a printed circuit board are disposed in the upper housing of the cell phone of the folding type according to the embodiment of the invention.

As shown in FIG. 4, the liquid crystal (LCD) display unit 2 includes the LCD body 20, a backlight unit 21, a liquid crystal holder 22 for holding them, and the liquid crystal panel 23. The LCD body 20, the backlight unit 21 and the liquid crystal holder 22 are integrated with the inner case 11.

The printed circuit board 3 is fixedly provided on a back face of the liquid crystal holder 22 as shown in FIG. 4. An LED (a light emitting diode) 51 to be a light source, an IrDA (infrared data communication) 52, a camera 53, a speaker (a receiver) 54 and a vibrator 55 are mounted on the printed circuit board 3 in addition to various electronic components as shown in FIG. 3.

The LED 51 serves to emit a light having a predetermined wavelength (□) and the light emitting operation of the light emitting panel 4 is carried out by only one LED 51. The light emitting operation of the LED 51 is controlled by a control portion (not shown) connected to the LED 51. The LED 51 emits a light in a predetermined mode, for example, in a telephone call from a partner and an incoming call of a mail, or a telephone call to a transmitting partner and a transmission of a mail, and furthermore, a photographing operation of the camera.

As shown in FIG. 3, the outer case 12 for covering these mounted components is provided with a hole 12A for emitting a panel illuminating light, a communicating window 12B for an infrared communicating light and a photographing window 12C for the camera in corresponding positions, respectively.

The light emitting panel 4 serves to cause a wide and large light emitting region to emit a light like a plane and to give a notice of an incoming call state to a user in the incoming call, and is fixed to the outer case 12 as shown in FIGS. 3 and 4. The light emitting panel 4 constitutes a light transmitting member 40 (constituting a light guiding unit) by using a transparent material having a shape of a thin plate, for example, a shape of an almost thin ellipse, for example, a base material such as PMMA (polymethyl methacrylate). A region (a central elliptic region) R1 within a constant range from a central part on a surface S1 side (corresponding to an upper surface in FIG. 4) of the light transmitting member 40 constitutes a mirror finished surface for reflecting a light from an inner part.

On the other hand, a wider and larger region (peripheral elliptic region) R2 on the outside of the central elliptic region R1 on the surface S1 side of the light transmitting member 40 constitutes a light emitting plane 44 capable of wholly emitting a light from the LED 51. The surface S1 of the light emitting panel 4 is provided with a V shaped groove 45 having a V-shaped section like an elliptical circle (like a ring) along a boundary portion of the central elliptic region R1 and the peripheral elliptic region R2, and a peripheral edge portion of the mirror finished surface (the central elliptic region R1) can be thus enhanced brightly.

Moreover, the light transmitting member 40 of the light emitting panel 4 is subjected to mirror-like finishing by forming a reflecting film 41 (constituting one of reflecting units) in the central elliptic region R1 on the surface S1 side (corresponding to the upper surface in FIG. 4) by using a material such as aluminum as shown in FIG. 4. In the central elliptic region R1, consequently, a light incident from the LED 51 into the light transmitting member 40 is prevented from leaking out in the central elliptic region R1, and at the same time, is reflected many times together with a print film 43 which will be described below so that the same light can be propagated to the light emitting plane (peripheral elliptic region R2) 44. It is possible to easily form the reflecting film 41 by so-called insert molding in which a film having a reflecting film applied and formed thereon is previously set into a cavity of a mold and is molded integrally with the light transmitting member 40 in the case in which the light transmitting member 40 is to be formed by injection molding.

On the other hand, in a central part on a back face S2 side (corresponding to a lower surface in FIG. 4) to be an opposite surface to the surface S1 side in the light transmitting member 40, an incident plane (an incident portion) 42 curved like a dome-shaped concave portion is formed in order to cause the light emitted from the LED 51 provided thereunder to be incident as evenly as possible in all directions in the light transmitting member 40. Referring to the curved shape of the incident plane 42 or a curvature thereof, various shapes or curvature values can be selected properly. However, they may be determined corresponding to an emitted light amount (light intensity) distribution (for example, a Gauss (normal) distribution) of the LED 51 to be a light source.

Furthermore, the light transmitting member 40 is provided with the print film 43 (constituting the other reflecting unit) printed to have a white color in a high reflectance in order to repetitively reflect the light incident from the LED 51 over almost the whole surface on the back face S2 side excluding the incident plane 42 many times (multiple reflection) together with the reflecting film 41 on the surface S1 side (see FIG. 5), and at the same time, to propagate the light in the light transmitting member 40, and to emit the light from the peripheral elliptic region R2 on the surface S1 side in a surface emitting state which is as uniform as possible. The print film 43 may be provided over the whole surface on the back face S2 side, and furthermore, may be formed on an edge portion side thereof, that is, in an end face portion.

While the print film 43 has such a structure as to be particularly colored to be white, thereby increasing the reflectance as greatly as possible, the color is not limited to the white but any color capable of suppressing an absorption to increase the reflectance as greatly as possible may be used. In order to implement a uniform surface emitting state in the light emitting plane 44 to be the peripheral elliptic region R2 on the surface S1 side, moreover, it is also possible to carry out a fine concavo-convex processing in the back face S2 portion of the light transmitting member 40 in which the print film 43 is to be formed and to laminate and print the print film 43 on the concavo-convex portion.

Moreover, it is also possible to provide a dielectric multi-layer film to be a reflecting member having a high wavelength (□) dependency which reflects a light emitted from a light source at a very high reflectance in place of the reflecting film 41 on the surface S1 side of the light transmitting member 40 (or as a lower film of the reflecting film (mirror finished surface reflecting portion) 41). Furthermore, the print film 43 on the back S2 side may be constituted by a dielectric multi-layer film in place of the white printing. With such a structure, a light incident on the light transmitting member 40 from the light source and sent forward is not absorbed at all on both of the surface and back face of the light transmitting member 40. Therefore, the light can be efficiently reflected and transmitted to the peripheral elliptic region R2, and the light emitted from the LED 51 can also be efficiently emitted from the light emitting plane 44 in a high illuminance.

Next, description will be given to the function of the embodiment.

The LED 51 emits a light in a phone call from a partner and an incoming call of a mail or a phone call to a transmitting partner or a transmission of a mail, and furthermore, a photographing operation of the camera.

Consequently, a light emitted from the LED 51 (for example, a blue light) is projected toward the dome-shaped incident plane 42 of the light transmitting member 40. The light sent toward the incident plane 42 is incident with a refraction on an interface of the incident plane 42 and advances into the light transmitting member 40. A light advancing from the LED 51 toward the central part of the incident plane 42 straight and upward is exactly incident into the light transmitting member 40 without a refraction on the interface.

Figure 5:
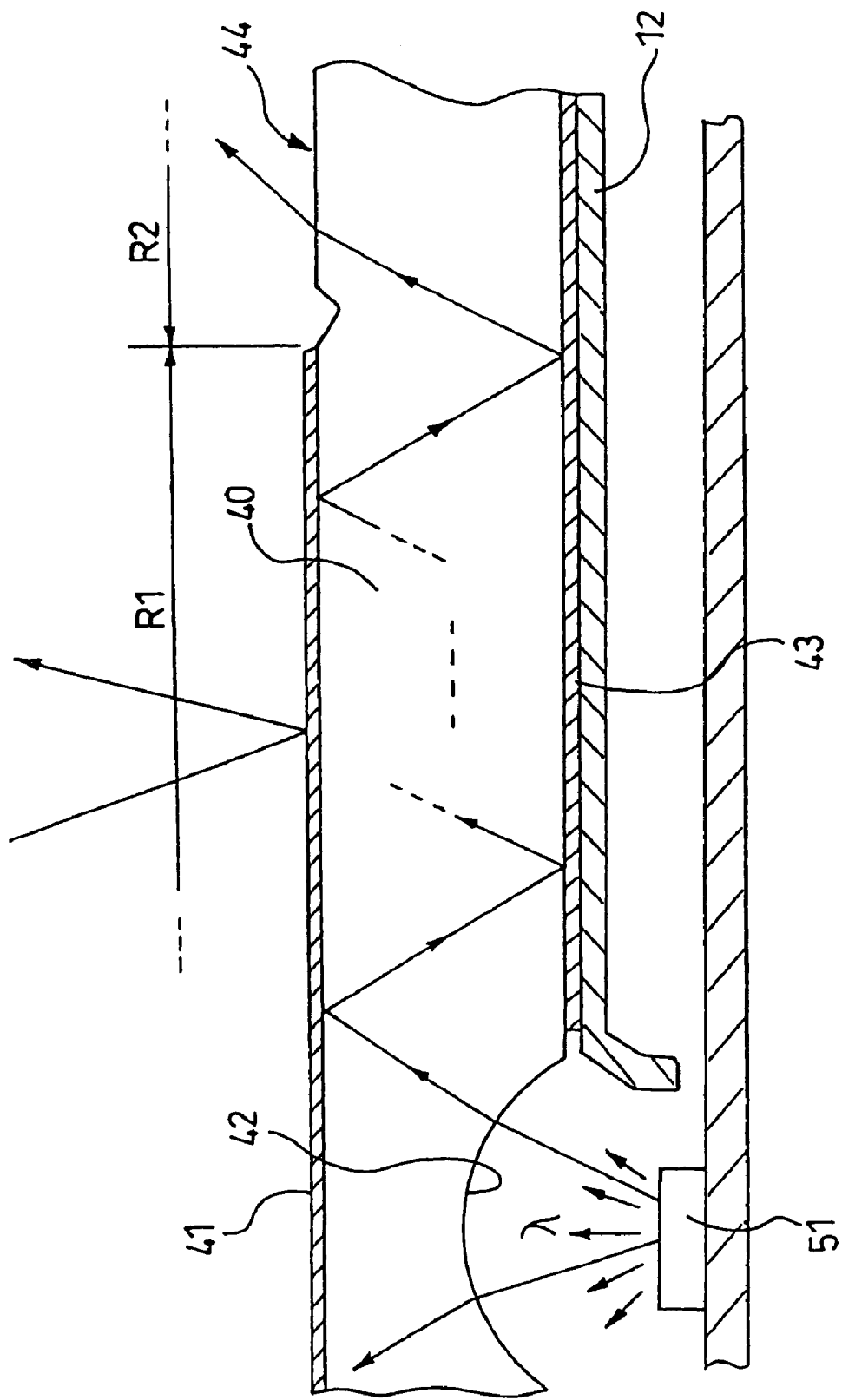
FIG. 5 is an explanatory view showing an optical path in which a light advances when the light emitted from the light source is propagated and a light 5 is emitted in a light transmitting member of the light emitting unit illustrated in FIG. 4.

The light emitted from the LED 51 and thus incident on the light transmitting member 40 is (regularly) reflected on the interface with the reflecting film 41 on the surface S1 side (an upper surface in FIG. 5) of the light transmitting member 40, and furthermore, the light thus reflected gradually advances in the direction of the end of the light transmitting member 40 (a perpendicular direction to a thickness direction: a transverse direction in FIG. 5) with a (regular) reflection on the interface with the print film 43 on the back S2 side (a lower surface in FIG. 5) of the light transmitting member 40.

When reaching the peripheral elliptic region R2 having no reflecting film 41 from the central elliptic region R1 on the surface S1 side of the light transmitting member 40, the light advancing in the light transmitting member 40 is emitted outward from the light emitting plane 44 of the surface S1 (the upper surface) of the light transmitting member 40. More specifically, the light emitted from the LED 51 and incident on the light transmitting member 40 does not leak in the central elliptic region R1 but is entirely emitted from the light emitting plane 44 and the V shaped groove 45 which constitute the peripheral elliptic region R2. Therefore, the light is emitted from the light emitting plane 44 and the V shaped groove 45 without a reduction in the amount of the light of the LED 51.

According to the embodiment, therefore, when there is a phone call from a partner or an incoming call of a mail with the housing folded, the light emitting plane 44 of the light emitting panel 4 is caused to emit a light. Consequently, the light emitting panel 4 has a large contour, and furthermore, the light is emitted without a reduction in the amount of the light. Thus, the contour can be made clear so that everybody can visually recognize that there is the incoming call reliably.

While the cell phone is constituted by the folding type in which the housing has the upper housing 1 and the lower housing (not shown) coupled to each other through the hinge portion which is not shown in the embodiment, the housing according to the invention may be constituted by a bar-shaped type in which a display unit and an operating unit are provided in one housing if there is a space capable of maintaining a light emitting unit to be large. Moreover, the invention is not restricted to the cell phone according to these embodiments but can be applied to various communication portable terminal devices, and it is possible to emit a light in order to brighten a distant region from a light source by a single light source without requiring a plurality of light sources. Consequently, the consumed power of a battery can also be minimized, which is advantageous.

While the invention has been described in detail with reference to the specific embodiment, moreover, it is apparent to the skilled in the art that various changes and modifications can be made without departing from the spirit and scope of the invention.

INDUSTRIAL APPLICABILITY

The communication portable terminal device according to the invention has such an advantage that a light can be emitted to brighten a large area by a single light source, and particularly, is useful for a communication portable terminal device for giving a notice of an incoming call by a light emitting operation.

What is claimed is:

1. A communication portable terminal device, comprising:
a light source, disposed in a housing; and
a light guiding panel, disposed in the housing for guiding a light from the light source,
wherein the light guiding panel includes:
a light transmitting member having a plate like shape, wherein the light transmitting member has:
an incident portion on which the light emitted from the light source is incident, and provided on a back face of the light transmitting member; and
an emitting portion from which the light transmitted from the light source is emitted, and provided on a front face of the light transmitting member; and
reflecting units for reflecting plural times the light emitted from the light source and incident on the incident portion and guiding the light to the emitting portion, wherein the reflecting units comprise a first reflecting unit and a second reflecting unit, wherein the first reflecting unit is provided on the front face of the light transmitting member and the second reflecting unit is provided on the back face of the light transmitting member,
wherein the light transmitting member further includes a V-shaped groove, and the V-shaped groove is provided in the vicinity of a surface boundary between the first reflecting member and the light transmitting member.

2. The communication portable terminal device according to claim 1, wherein the second reflecting unit includes a colored reflecting print portion with high reflectance on the back face side of the light transmitting member.

3. The communication portable terminal device according to claim 1, wherein the incident portion is a curved concave surface of the light transmitting member formed on the back face of the light transmitting member and arranged just above the light source.

4. The communication portable terminal device according to claim 1, wherein the housing comprises a foldable structure, and includes:
an upper housing having a liquid crystal display unit on an inner side surface thereof; and
a lower housing having an operating key provided on an inner side surface thereof opposed to the inner side surface of the upper housing when the upper housing and the lower housing are set in a closing state, the lower housing being rotatably coupled to the upper housing through a hinge portion; and
wherein the light guiding panel is disposed on an outer side face that is opposite to the inner side surface of the upper housing, and the emitting portion on the front face faces an outside.

5. The communication portable terminal device according to claim 1, wherein the first reflecting member and the second reflecting member repetitively reflect the light emitted from the light source to propagate the light in the light transmitting member and to emit the light from the emitting portion.

6. A communication portable terminal device, comprising:
a light source, disposed in a housing; and
a light guiding panel, disposed in the housing for guiding a light from the light source,
wherein the light guiding panel includes:
a light transmitting member having a plate like shape, wherein the light transmitting member has:
an incident portion on which the light emitted from the light source is incident, and provided on a back face of the light transmitting member; and
an emitting portion from which the light transmitted from the light source is emitted, and provided on a front face of the light transmitting member; and
reflecting units for reflecting plural times the light emitted from the light source and incident on the incident portion and guiding the light to the emitting portion, wherein the reflecting units comprise a first reflecting unit and a second reflecting unit, wherein the first reflecting unit is provided on the front face of the light transmitting member and the second reflecting unit is provided on the back face of the light transmitting member,
wherein the first reflecting member is provided at approximately a center of the light transmitting member, and a V-shaped groove is provided at a surface boundary between the first reflecting member and the light transmitting member.

* * * * *